C. A. TRIPP.
DEMOUNTABLE COLLAPSIBLE RIM.
APPLICATION FILED OCT. 21, 1918.

1,300,052.

Patented Apr. 8, 1919.

INVENTOR.
Clarence A. Tripp.
BY
Hazard & Miller
ATTORNEYS.

UNITED STATES PATENT OFFICE.

CLARENCE A. TRIPP, OF MOJAVE, CALIFORNIA.

DEMOUNTABLE COLLAPSIBLE RIM.

1,300,052.   Specification of Letters Patent.   Patented Apr. 8, 1919.

Application filed October 21, 1918. Serial No. 259,032.

*To all whom it may concern:*

Be it known that CLARENCE A. TRIPP, a citizen of the United States, residing at Mojave, in the county of Kern and State of California, have invented new and useful Improvements in Demountable Collapsible Rims, of which the following is a specification.

My invention relates to a demountable rim for a pneumatic tire and more particularly to a demountable rim that is also collapsible.

The object of my invention is to provide a demountable rim that may be readily collapsed for convenience in mounting a tire upon it or removing a tire from it.

With this and other objects in view my invention consists in the construction, combination and arrangement of parts hereinafter described and claimed.

In the accompanying drawings which form a part of this specification,

Figure 1:
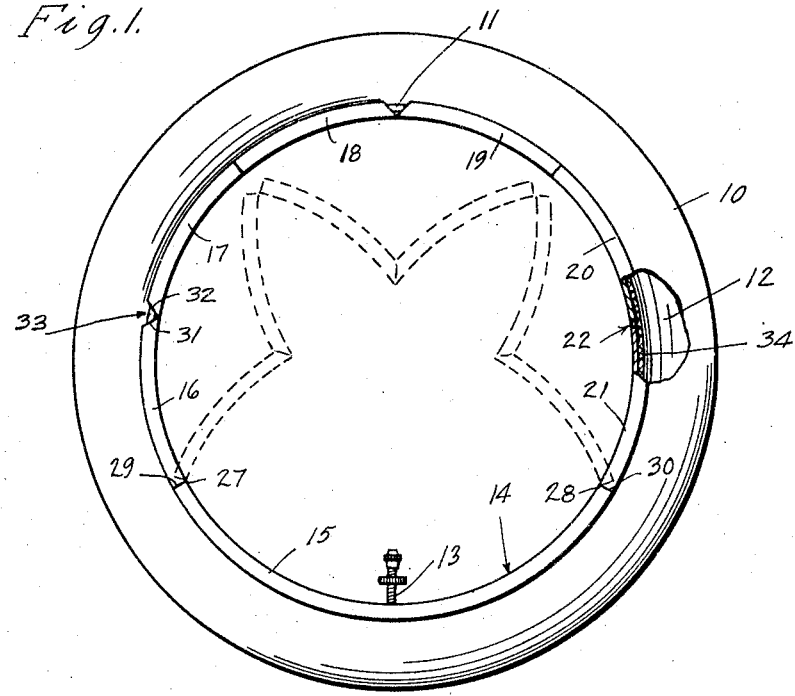
Figure 1 is a view in front elevation of a tire mounted upon a demountable rim embodying the principles of my invention, parts being broken away to show the construction of one of its joints.
Figure 2:
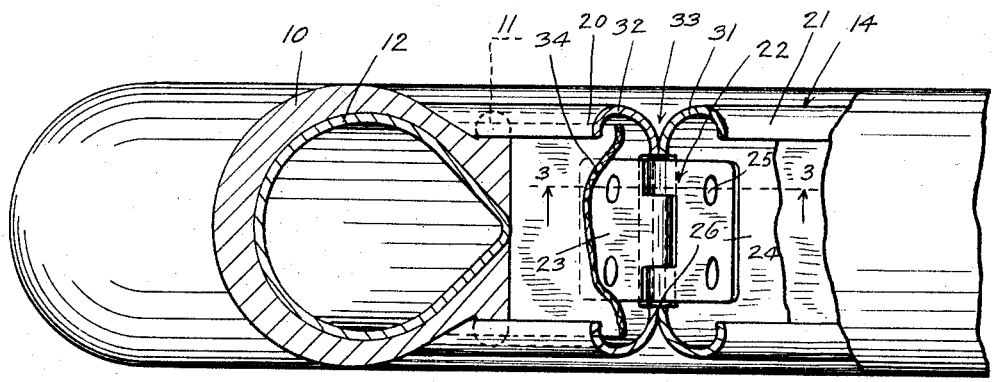
Fig. 2 is an enlarged fragmentary view of the tire and rim shown in Fig. 1, part of the tire being broken away and shown in section to disclose the rim.
Figure 3:
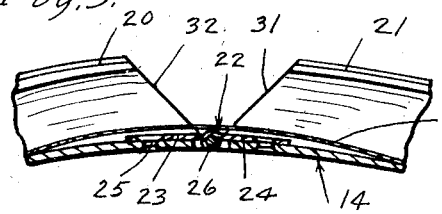
Fig. 3 is a fragmentary sectional view on the line 3—3 of Fig. 2.

As shown on the drawings the tire may be of the common pneumatic type having a casing 10 with beads 11 adapted to engage with a clencher rim and having an inner tube 12 and a tire valve 13. The rim 14 is of the solid clencher type having a larger section 15 through the middle of which the air tube extends and a series of smaller sections 16, 17, 18, 19, 20 and 21 which join end to end with each other and with the larger section to form a closed ring. The smaller sections are joined to the larger section and to each other by hinges 22. The hinge plates 23 and 24 are fixed to the ends of the rim section on their outer or tire side by rivets 25 in such a position that the hinge pin 26 extends inwardly between the ends of the rim sections. The ends 27 and 28 of the larger section are cut on radial lines squarely across the rim. The end 29 of the short section which is hinged to the end 27 of the long section and the end 30 of the short section which is hinged to the end 29 of the long section are also cut on radial lines so that when the rim is in its extended position the ends 27 and 29 and also the ends 28 and 30 butt squarely against each other. The end 31 of short section 16 and the end 32 of the short section 17 have their curved flanges cut away at an oblique angle to a radial line so as to leave a triangular gap 33 between the flange parts on each side of the meeting ends of the two sections when in their expanded positions. This provides clearance for this pair of sections when in their collapsed position. The opposite end of section 17 and the end of section 18 adjacent to it to which it is hinged are cut straight across and so on around the rim; so that alternate joints are closed and alternate joints have a clearance gap, this arrangement being secured by cutting one end of each of the sections 17, 18, 19, 20 and 21 square and the other at an oblique angle and hinging the square ends together and the beveled ends together as illustrated in Fig. 1. The square ends 29 and 30 of the series thus formed by the shorter sections are finally hinged to the square ends 27 and 28 of the longer section.

Operation: When it is desired to mount a tire on the rim the small sections of the rim are pushed inwardly at the beveled joints until they assume the position indicated by the dotted line in Fig. 1. It is evident that the alternate hinges bend in different directions and that the square ended joints open while the beveled ended joints close, this being possible because of the clearance provided between the flanges by cutting away their corners. A band 34 of canvas or the like is fixed within the rim channel to protect the inner tube. The tire valve is inserted through the rim and the tire pulled over the rim in the usual way. The beveled joints are now pulled outwardly against the tire one by one, the last one expanding the rim into place and holding it in a locked and expanded position. When it is desired to remove the tire from the rim, one of the beveled joints is pulled inwardly and then another until the tire is released. From the foregoing description it is evident that I have provided a simple and convenient collapsible rim adaptable to any form of clencher tire.

Though I have shown a seven section rim it will be seen that a greater or smaller number of sections might be employed and while I have shown a clencher rim, it is evident that my invention might be applied to other forms of rims. It will also be understood that other changes in construction, combination and arrangement of parts may be made by those skilled in the art without departing from the spirit of my invention as claimed.

I claim:

A demountable collapsible rim for an automobile tire and the like, comprising a longer rim section forming less than half a circle and which has square cut ends and six shorter rim sections, each of which has a square cut end and a bevel cut end, said shorter sections being hinged end to end in a series in such a way that bevel cut ends are hinged to bevel cut ends and square cut ends are hinged to square cut ends thus providing clearance openings at alternate joints, said series having square cut ends which are hinged to the square cut ends of said longer section, so that of the series of joints thus formed alternate ones are adapted to bend inwardly and alternate ones outwardly thus permitting the collapsing of the rim.

In testimony whereof I have signed my name to this specification.

CLARENCE A. TRIPP.

Copies of this patent may be obtained for five cents each, by addressing the "Commissioner of Patents, Washington, D. C."